(12) United States Patent
Renner et al.

(10) Patent No.: US 7,908,911 B2
(45) Date of Patent: Mar. 22, 2011

(54) FUEL USAGE MONITORING SYSTEM FOR A SERVICE PACK

(75) Inventors: Ross Renner, Black Creek, WI (US);
Benjamin G. Peotter, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/369,558

(22) Filed: Feb. 11, 2009

(65) Prior Publication Data
US 2010/0199753 A1 Aug. 12, 2010

(51) Int. Cl.
*G01M 15/00* (2006.01)
(52) U.S. Cl. .................................... 73/114.52
(58) Field of Classification Search ............... 73/114.52
See application file for complete search history.

(56) References Cited

U.S. PATENT DOCUMENTS

| | | | | |
|---|---|---|---|---|
| 3,512,600 A * | 5/1970 | Adams | | 180/314 |
| 4,189,021 A * | 2/1980 | Scheuerpflug et al. | | 180/69.6 |
| 4,475,380 A * | 10/1984 | Colovas et al. | | 73/114.53 |
| 4,620,568 A * | 11/1986 | Sumerford et al. | | 137/899.4 |
| 5,652,378 A * | 7/1997 | Dussault | | 73/114.52 |
| 5,693,876 A * | 12/1997 | Ghitea et al. | | 73/114.53 |
| 6,092,021 A | 7/2000 | Ehlbeck et al. | | |
| 6,542,853 B1* | 4/2003 | Murakami et al. | | 702/183 |
| 6,560,528 B1 | 5/2003 | Gitlin et al. | | |
| 7,150,159 B1* | 12/2006 | Brummett et al. | | 62/236 |
| 7,216,480 B2* | 5/2007 | Suzuki et al. | | 60/285 |
| 7,308,883 B2* | 12/2007 | Suzuki | | 123/198 R |
| 7,454,962 B2* | 11/2008 | Nishiyama et al. | | 73/114.52 |
| 7,532,974 B2* | 5/2009 | Sato et al. | | 701/123 |
| 2003/0195676 A1 | 10/2003 | Kelly et al. | | |
| 2004/0035112 A1* | 2/2004 | Bhabra | | 60/698 |
| 2005/0079949 A1* | 4/2005 | Suzuki | | 477/2 |
| 2008/0122195 A1 | 5/2008 | Beeson et al. | | |
| 2008/0264919 A1 | 10/2008 | Helf et al. | | |
| 2008/0264920 A1 | 10/2008 | Leisner et al. | | |
| 2008/0264921 A1 | 10/2008 | Kropp et al. | | |
| 2008/0264922 A1* | 10/2008 | Fosbinder | | 219/133 |
| 2009/0193800 A1* | 8/2009 | Peters | | 60/327 |
| 2009/0194067 A1* | 8/2009 | Peotter et al. | | 123/350 |
| 2009/0196767 A1* | 8/2009 | Peters | | 417/212 |
| 2009/0218327 A1* | 9/2009 | Beeson | | 219/133 |
| 2009/0242301 A1* | 10/2009 | McClanahan et al. | | 180/69.6 |

OTHER PUBLICATIONS

U.S. Appl. No. 12/040,328, filed Feb. 29, 2008 by Beeson.

(Continued)

*Primary Examiner* — Lisa M Caputo
*Assistant Examiner* — Freddie Kirkland, III
(74) *Attorney, Agent, or Firm* — Fletcher Yoder

(57) ABSTRACT

A fuel usage monitoring system, in certain aspects, may be configured to determine the fuel usage rate of a work vehicle service pack engine using control signals relating to operating parameters of the service pack engine and associated equipment. In certain embodiments, the control signals may relate to operating parameters of the engine, a fuel injection pump associated with the engine, a governor associated with the fuel injection pump, a fuel reservoir associated with the engine, and other components associated with the engine. In particular, the control signals may relate a position of a control rack of the fuel injection pump. The control signals may be correlated with fuel usage rates prior to operation of the fuel usage monitoring system. In addition, the correlations may vary as certain parameters of the engine, such as operating speed, vary. The correlations may be implemented as algorithms within software of the fuel usage monitoring system.

20 Claims, 7 Drawing Sheets

OTHER PUBLICATIONS

U.S. Appl. No. 12/358,119, filed Jan. 22, 2009 by Peters.
U.S. Appl. No. 12/358,147, filed Jan. 22, 2009 by Peters.
U.S. Appl. No. 12/361,394, filed Jan. 28, 2009 by Peotter.
U.S. Appl. No. 12/367,400, filed Feb. 6, 2009 by Renner.

* cited by examiner

FUEL USAGE MONITORING SYSTEM FOR A SERVICE PACK

BACKGROUND

The invention relates generally to fuel usage monitoring systems. More specifically, the invention relates to a system for monitoring the fuel usage of a service pack engine.

The service engine of a work vehicle service pack generally drives various loads, such as an air compressor, an electrical generator, and a hydraulic pump. The service engine may be a diesel engine and may use either the work vehicle's fuel tank or its own stand-alone fuel tank. In either case, the use of fuel by a work vehicle service pack engine may be characterized as "off road" fuel usage. As such, the use of fuel by the work vehicle service pack engine may be eligible for applicable tax credits. Therefore, the ability to reliably monitor fuel usage of the service pack engine in a low-cost manner may prove financially beneficial.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A fuel usage monitoring system, in certain aspects, may be configured to determine the fuel usage rate of a work vehicle service pack engine using control signals relating to operating parameters of the service pack engine and associated equipment. In certain embodiments, the control signals may relate to operating parameters of the engine, a fuel injection pump associated with the engine, a governor associated with the fuel injection pump, a fuel reservoir associated with the engine, and other components associated with the engine. In particular, the control signals may relate a position of a control rack of the fuel injection pump. The control signals may be correlated with fuel usage rates prior to operation of the fuel usage monitoring system. In addition, the correlations may vary as certain parameters of the engine, such as operating speed, vary. The correlations may be implemented as algorithms within software of the fuel usage monitoring system.

DRAWINGS

These and other features, aspects, and advantages of the present invention will become better understood when the following detailed description is read with reference to the accompanying drawings in which like characters represent like parts throughout the drawings, wherein.

Figure 7:
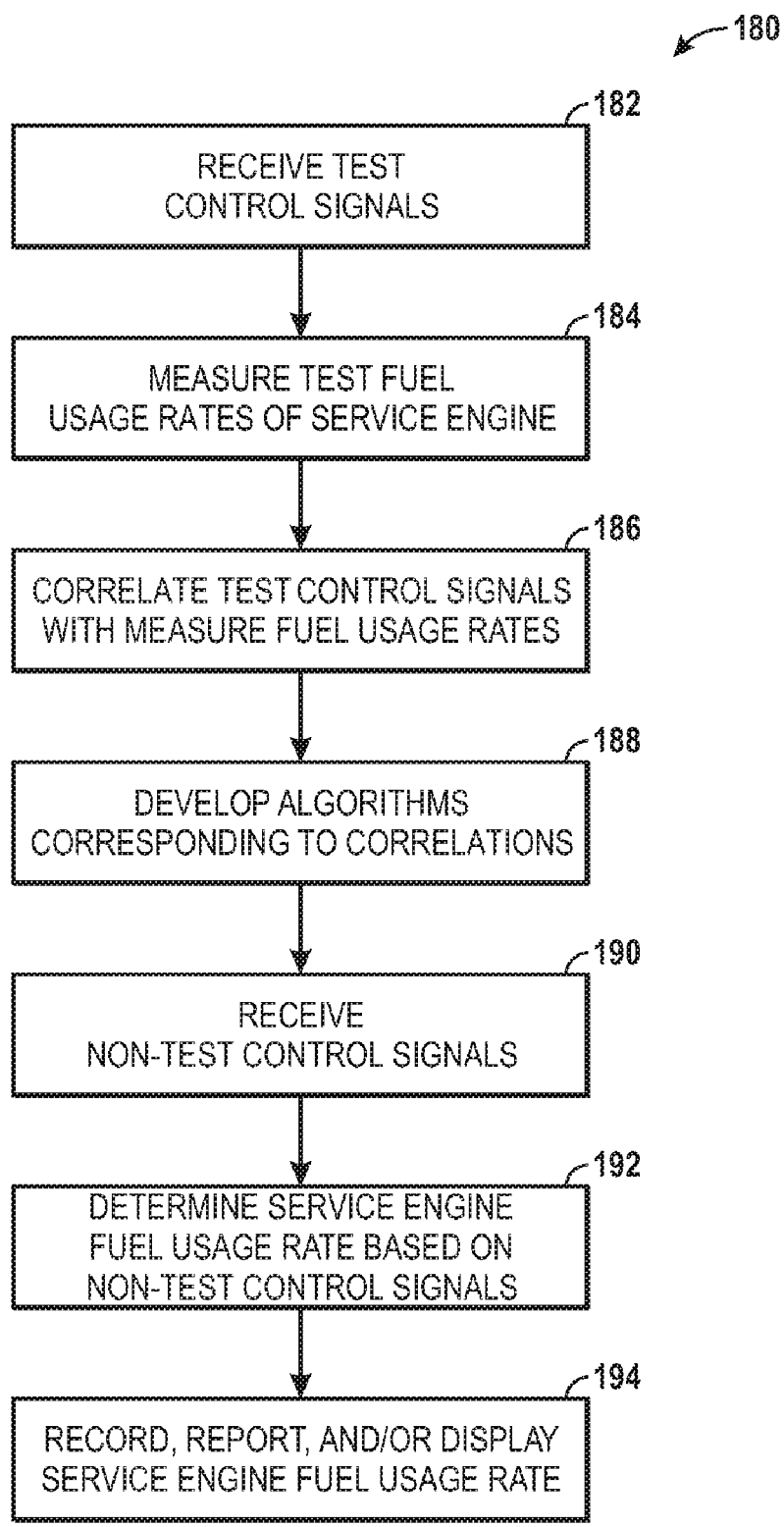
Figure 8A:
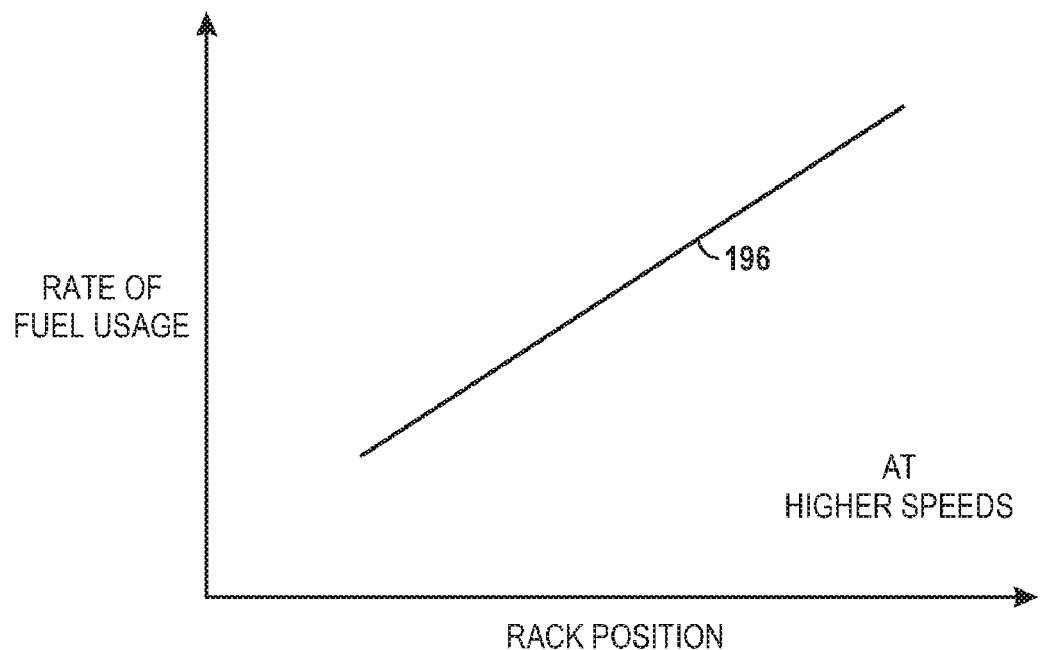
Figure 8B:
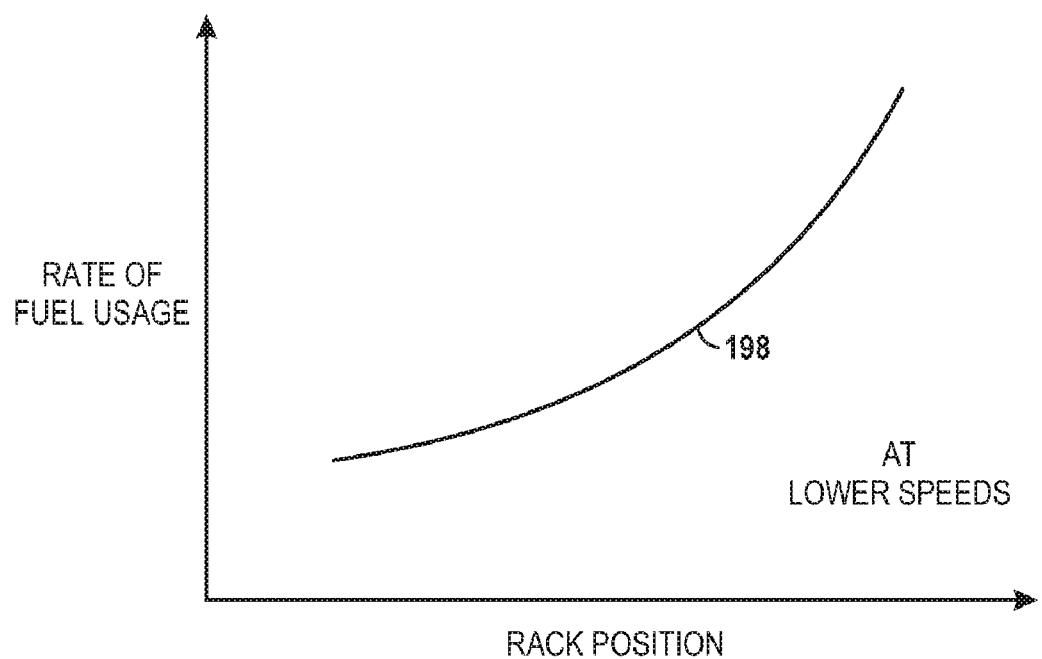

FIG. 7 is a flow chart illustrating an exemplary method for determining the fuel usage rate of the service engine based on the control signals generated by the service engine, the governor, the fuel injection pump, the fuel reservoir, or other components of the service pack and/or work vehicle; and FIGS. 8A and 8B are graphs illustrating exemplary correlations between fuel usage rates of the service engine and positions of the control rack of the fuel injection pump at higher and lower service engine operating speeds, respectively.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, a fuel usage monitoring system may be configured to measure the fuel usage of a service pack engine, which may be a part of a service pack mounted on a work vehicle or other mobile application. Although fuel usage monitoring systems may use flow meters to measure fuel usage, such flow meters can be somewhat expensive. Therefore, the fuel usage monitoring system described herein may be configured to reliably monitor fuel usage of the service pack engine without the use of flow meters.

In particular, in diesel engines, a fuel rack position controls the amount fuel that enters the engine cylinders for combustion. The heavier the load, the more fuel that the engine needs to keep running at a given operating speed. A governor system of the engine adjusts the opening of the fuel rack to allow more fuel to enter the engine cylinders and, therefore, maintains the operating speed of the engine as the load increases.

In the service pack system, the engine may have a throttle control solenoid that is electronically controlled and holds the fuel rack in position. If the load increases, the throttle control solenoid opens the fuel rack to allow more fuel to enter the engine cylinders and keep the engine at a desired operating speed. The control signal to the throttle control solenoid may be proportional to the amount of fuel used. By monitoring the control signal, the fuel usage rate may be extracted using test data correlating the throttle control solenoid signal to fuel usage rate. As described in greater detail below, this is but one of the exemplary methods for determining fuel usage of the service pack engine using control signals to and from the service pack engine and associated equipment. For instance, in other embodiments, a control signal relating to the position of the fuel rack may be generated by a position sensor.

In certain embodiments, the disclosed fuel usage monitoring techniques may be used with various service packs to monitor the fuel usage of a diesel engine power source that is directly coupled to multiple loads, specifically an air compressor, hydraulic pump, and electrical generators. For example, the disclosed embodiments may be used in combination with any and all of the embodiments set forth in U.S. application Ser. No. 11/742,399, filed on Apr. 30, 2007, and entitled "ENGINE-DRIVEN AIR COMPRESSOR/GENERATOR LOAD PRIORITY CONTROL SYSTEM AND METHOD," which is hereby incorporated by reference in its entirety. By further example, the disclosed embodiments may be used in combination with any and all of the embodiments set forth in U.S. application Ser. No. 11/943,564, filed on Nov. 20, 2007, and entitled "AUXILIARY SERVICE PACK FOR A WORK VEHICLE," which is hereby incorporated by reference in its entirety.

Figure 1:
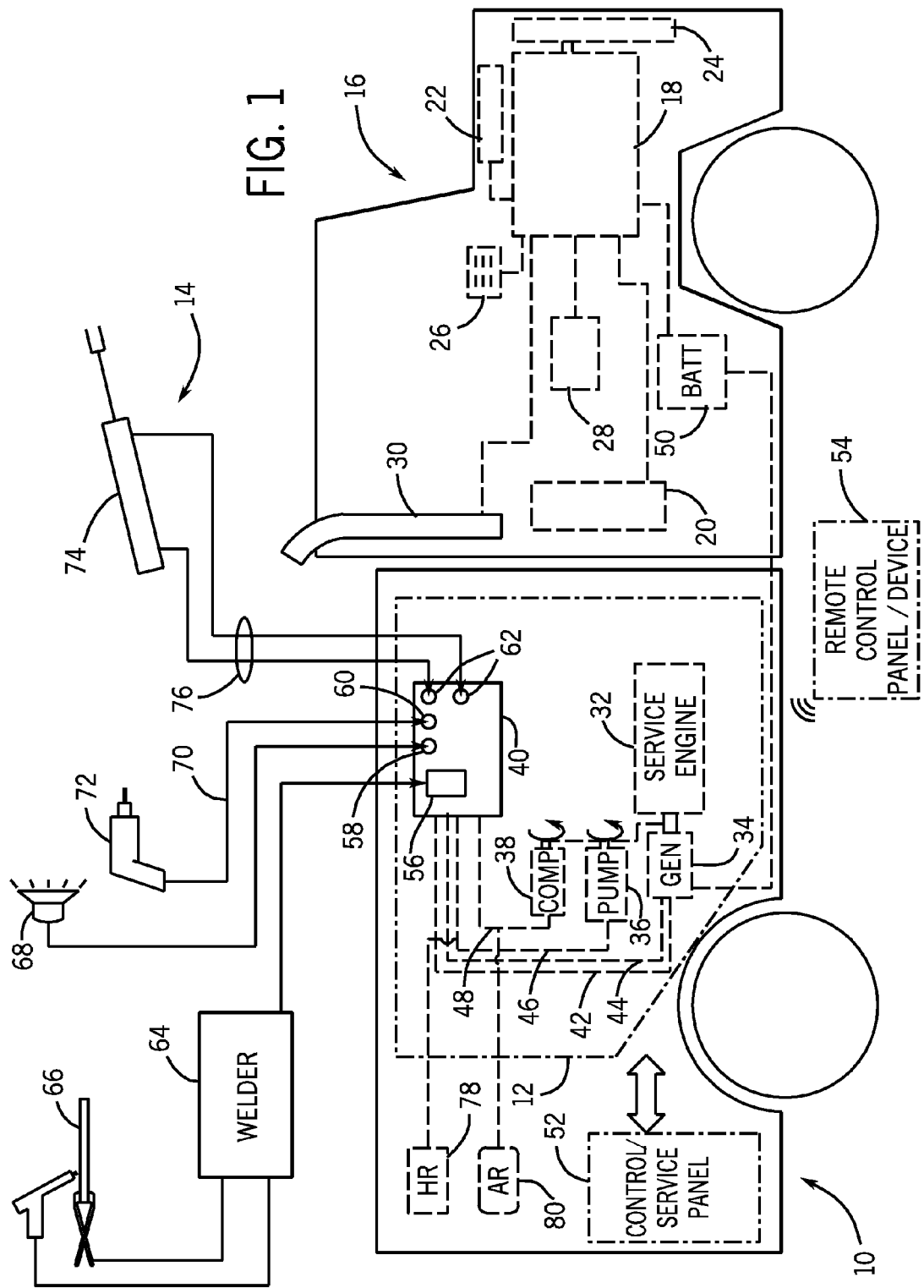
FIG. 1 is a diagram of an embodiment of a work vehicle having a service pack with a fuel usage monitoring system.

FIG. 1 illustrates a work vehicle 10 in accordance with the present invention. The work vehicle 10 is illustrated as a work truck, although any suitable configuration for the work vehicle 10 may be utilized. In the illustrated embodiment, the work vehicle 10 includes a service pack 12 for supplying electrical power, compressed air, and hydraulic power to a range of applications, designated generally by reference numeral 14. The work vehicle 10 has a main vehicle power plant 16 based around a work vehicle engine 18. As described in greater detail below, the work vehicle 10 may include a fuel usage monitoring system for monitoring the fuel usage of an engine of the service pack 12. Although the invention is not limited to any particular configuration or equipment, work vehicle engines of this type will typically be diesel engines, although gasoline engines may be used in some vehicles.

The vehicle power plant 16 may include a number of conventional support systems. For example, the work vehicle engine 18 may consume fuel from a fuel reservoir 20, typically one or more liquid fuel tanks. An air intake or air cleaning system 22 may supply air to the work vehicle engine 18, which may, in certain applications, be turbo-charged or super-charged. A cooling system 24, which may typically include a radiator, a circulation pump, a thermostat-controlled valve, and a fan, may provide for cooling the work vehicle engine 18. An electrical system 26 may include an alternator or generator, along with one or more system batteries, cabling for these systems, cable assemblies routing power to a fuse box or other distribution system, and so forth. A lube oil system 28 may typically be included for many engine types, such as for diesel engines. Such lube oil systems 28 typically draw oil from the diesel engine crankcase and circulate the oil through a filter and cooler, if present, to maintain the oil in good working condition. Finally, the power plant 16 may be served by an exhaust system 30, which may include catalytic converters, mufflers, and associated conduits.

The service pack 12 may include one or more service systems driven by a service engine 32. In a present embodiment, the service pack 12 may provide electrical power, hydraulic power, and compressed air for the various applications 14. In the diagrammatical representation of FIG. 1, for example, the service engine 32 may drive a generator 34, a hydraulic pump 36, and an air compressor 38. The service engine 32 may be of any desired type, such as a diesel engine. However, certain embodiments may use gasoline engines or other types of engines. The generator 34 may be directly driven by the service engine 32, such as by close coupling the generator 34 to the service engine 32, or may be belt-driven or chain-driven. The generator 34 may include three-phase brushless types, capable of producing power for a range of applications. However, other types of generators 34 may be employed, including single-phase generators and generators capable of producing multiple power outputs. The hydraulic pump 36 may be based on any conventional technology, such as piston pumps, gear pumps, vane pumps, and so forth and may be used with or without closed-loop control of pressure and/or flow. The air compressor 38 may also be of any suitable type, such as a rotary screw air compressor. Other suitable air compressors 38 may include reciprocating compressors, typically based upon one or more reciprocating pistons.

The systems of the service pack 12 may include appropriate conduits, wiring, tubing, and so forth for conveying the service generated by these components to an access point 40. Convenient access points 40 may be located around the periphery of the work vehicle 10. In a presently contemplated embodiment, all of the services may be routed to a common access point 40, although multiple access points 40 may certainly be utilized. The diagrammatical representation of FIG. 1 illustrates the generator 34 as being coupled to electrical cabling 42 (for AC power supply) and 44 (for 12-volt DC power supply), whereas the hydraulic pump 36 is coupled to a hydraulic circuit 46, and the air compressor 38 is coupled to an air circuit 48. The wiring and circuitry for all three systems will typically include protective circuits for the electrical power (e.g., fuses, circuit breakers, and so forth) as well as valving for the hydraulic and air service. For the supply of electrical power, certain types of power may be conditioned (e.g., smoothed, filtered, and so forth), and 12-volt power output may be provided by rectification, filtering, and regulating of the AC output. Valving for hydraulic power output may include, by way example, pressure relief valves, check valves, shut-off valves, as well as directional control valving.

In certain embodiments, the generator 34 may be coupled to the work vehicle electrical system 26, and particularly to the work vehicle battery 50. Thus, as described below, not only may the service pack 12 allow for 12-volt loads to be powered without operation of the main work vehicle engine 18, but the work vehicle battery 50 may serve as a shared battery, and may be maintained in a good state of charge by the service pack generator output.

The cabling, circuits, and conduits 42, 44, 46, and 48 may route service for all of these systems directly from connections on the service pack 12. For example, connections may be provided at or near the access point 40 of the service pack 12, such that connections can easily be made without the need to open an enclosure of the access point 40. Moreover, certain control functions may be available from a control and service panel 52. The control and service panel 52 may be located on any surface of the work vehicle 10 or at multiple locations on the work vehicle 10, and may be covered by doors or other protective structures. The control and service panel 52 need not be located at the same location, or even near the locations of the access point 40 to the electrical, hydraulic, and compressed air output points of the service pack 12. For example, the control and service panel 52 may be provided in a rear compartment covered by an access door. The control and service panel 52 may permit, for example, starting and stopping of the service engine 32 by a keyed ignition or starter button. Other controls for the service engine 32 may also be provided on the control and service panel 52. The control and service panel 52 may also provide operator interfaces for monitoring the service engine 32, such as fuel level gages, pressure gages, as well as various lights and indicators for parameters such as pressure, speed, and so forth. The control and service panel 52 may also include a stop, disconnect, or disable switch that allows the operator to prevent starting of the service engine 32, such as during transport.

As also illustrated in FIG. 1, a remote control panel or device 54 may also be provided that may communicate with the control and service panel 52 or directly with the service pack 12 wirelessly. The operator may start and stop the service pack engine 32, and control certain functions of the service pack 12 (e.g., engagement or disengagement of a clutched component, such as the hydraulic pump 36) without directly accessing either the components within the service pack 12 or the control and service panel 52.

As noted above, any desired location may be selected as a convenient access point 40 for one or more of the systems of the service pack 12. In the illustrated embodiment, for example, one or more alternating current electrical outputs, which may take the form of electrical receptacles 56 (for AC power) and 58 (for 12-volt DC power) may be provided. Similarly, one or more pneumatic connections 60, typically in the form of a quick disconnect fitting, may be provided. Similarly, hydraulic power and return connections 62 may be provided, which may also take the form of quick disconnect fittings.

In the embodiment illustrated in FIG. 1, the applications 14 may be coupled to the service pack 12 by interfacing with the outputs provided by the AC electrical receptacle 56. For example, a portable welder 64 may be coupled to the AC electrical receptacle 56, and may provide power suitable for a welding application 66. More specifically, the portable welder 64 may receive power from the electrical output of the generator 34, and may contain circuitry designed to provide for appropriate regulation of the output power provided to cables suitable for the welding application 66. The presently contemplated embodiments include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gases and other shielding supplies. Such wire feeders may be coupled to the service pack 12 and be powered by the service pack 12.

Similarly, DC loads may be coupled to the DC receptacle 58. Such loads may include lights 68, or any other loads that would otherwise be powered by operation of the main work vehicle engine 18. The 12-volt DC output of the service pack 12 may also serve to maintain the work vehicle battery charge, and to power any ancillary loads that the operator may need during work (e.g., cab lights, hydraulic system controls, and so forth).

The pneumatic and hydraulic applications may similarly be coupled to the service pack 12 as illustrated in FIG. 1. For example, a hose 70 or other conduit may be routed from the compressed air source at the outlet 60 to a pneumatic load 72, such as an impact wrench. However, many other types of pneumatic loads 72 may be utilized. Similarly, a hydraulic load 74, such as a reciprocating hydraulic cylinder may be coupled to the hydraulic service 62 by means of appropriate hoses or conduits 76. As noted above, certain of these applications, particularly the hydraulic applications, may call for the use of additional valving. Such valving may be incorporated into the work vehicle 10 or may be provided separately either in the application itself or intermediately between the service pack 12 and the hydraulic actuators. It should also be noted that certain of the applications 14 illustrated in FIG. 1 may be incorporated into the work vehicle 10. For example, the work vehicle 10 may be designed to include a man lift, scissor lift, hydraulic tail gate, or any other driven systems which may be coupled to the service pack 12 and driven separately from the main work vehicle engine 18.

The service pack 12 may be physically positioned at any suitable location in the work vehicle 10. For example, the service engine 32 may be mounted on, beneath or beside the vehicle bed or work platform rear of the vehicle cab. In many such work vehicles 10, for example, the work vehicle chassis may provide convenient mechanical support for the service engine 32 and certain of the other components of the service pack 12. For example, steel tubing, rails, or other support structures extending between front and rear axles of the work vehicle 10 may serve as a support for the service engine 32. Depending upon the system components selected and the placement of the service pack 12, reservoirs may also be provided for storing hydraulic fluid and pressurized air, such as hydraulic reservoir 78 and air reservoir 80. However, the hydraulic reservoir 78 may be placed at various locations or even integrated into an enclosure of the service pack 12. Likewise, depending upon the air compressor 38 selected, no air reservoir 80 may be used for compressed air.

The service pack 12 may provide power for on-site applications completely separately from the work vehicle engine 18. That is, the service engine 32 may generally not be powered during transit of the work vehicle 10 from one service location to another, or from a service garage or facility to a service site. Once located at the service site, the work vehicle 10 may be parked at a convenient location, and the main work vehicle engine 18 may be shut down. The service engine 32 may then be powered to provide service from one or more of the service systems described above. In certain embodiments, clutches or other mechanical engagement devices may be provided for engagement and disengagement of one or more of the generator 34, the hydraulic pump 36, and the air compressor 38. Moreover, where stabilization of the work vehicle 10 or any of the systems is beneficial, the work vehicle 10 may include outriggers, stabilizers, and so forth, which may be deployed after parking the work vehicle 10 and prior to operation of the service pack 12.

Figure 2:
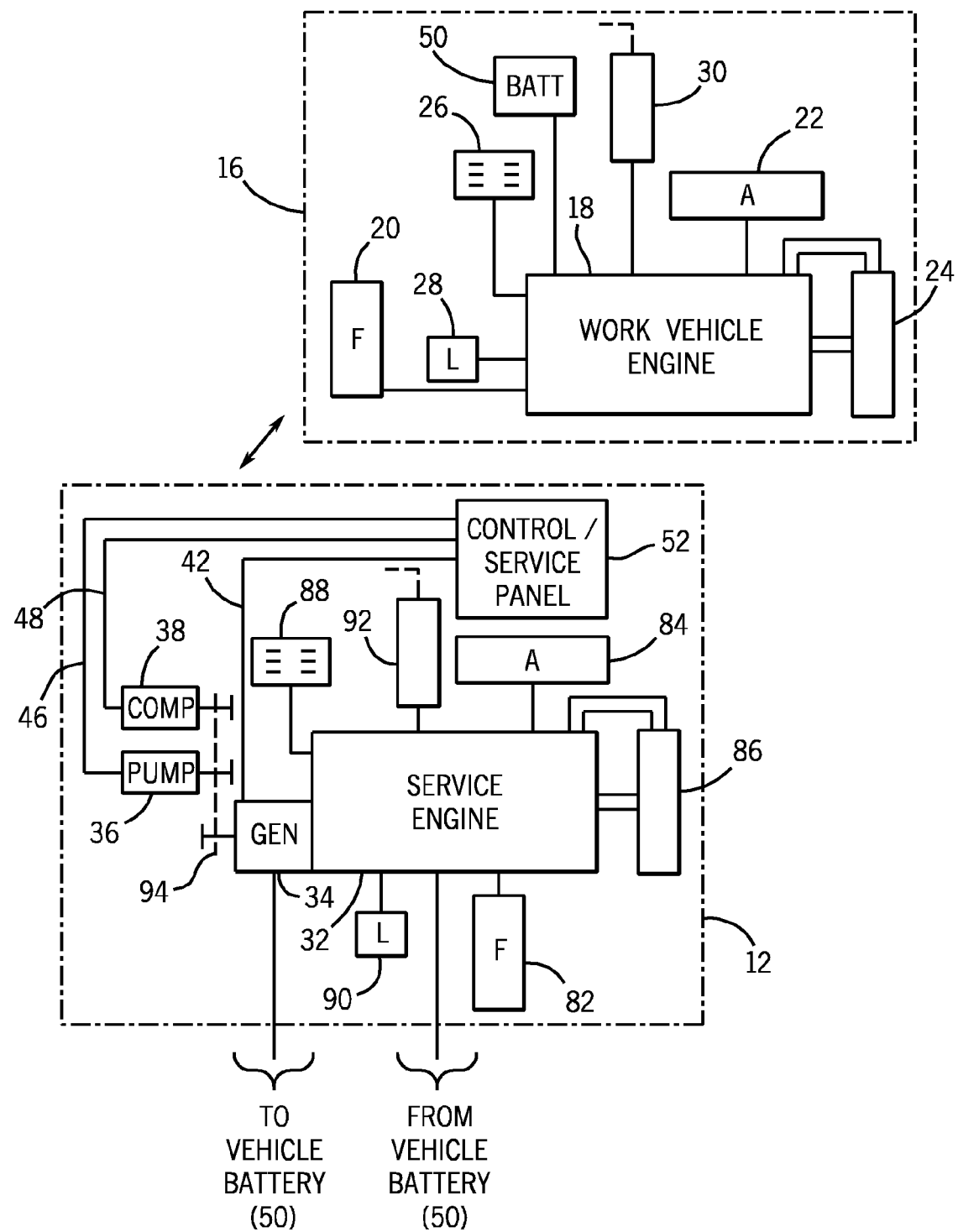
FIG. 2 is a diagram of an embodiment of power systems in the work vehicle of FIG. 1, illustrating support systems of the service pack completely separate and independent from support systems of a work vehicle engine.

Several different scenarios may be implemented for driving the components of the service pack 12, and for integrating or separating the support systems of the service pack 12 from those of the work vehicle power plant 16. One such approach is illustrated in FIG. 2, in which the service pack 12 is entirely independent and operates completely separately from the work vehicle power plant 16. In the embodiment illustrated in FIG. 2, the support systems for the work vehicle power plant 16 are coupled to the work vehicle engine 18 in the manner set forth above. In this embodiment, the service pack 12 may reproduce some or all of these support systems for operation of the service engine 32. For example, these support systems may include a separate fuel reservoir 82, a separate air intake or air cleaning system 84, a separate cooling system 86, a separate electrical protection and distribution system 88, a separate lube oil system 90, and a separate exhaust system 92.

Many or all of these support systems may be provided local to the service engine 32, in other words, at the location where the service engine 32 is supported on the work vehicle 10. On larger work vehicles 10, access to the location of the service engine 32, and the service pack 12 in general, may be facilitated by the relatively elevated clearance of the work vehicle 10 over the ground. Accordingly, components such as the fuel reservoir 82, air intake or air cleaning system 84, cooling system 86, electrical protection and distribution system 88, and so forth, may be conveniently positioned so that these components can be readily serviced. Also, the hydraulic pump 36 and air compressor 38 may be driven by a shaft extending from the generator 34, such as by one or belts or chains 94. As noted above, one or both of these components, or the generator 34 itself, may be provided with a clutch or other mechanical disconnect to allow them to idle while other systems of the service pack 12 are operative.

Figure 3:
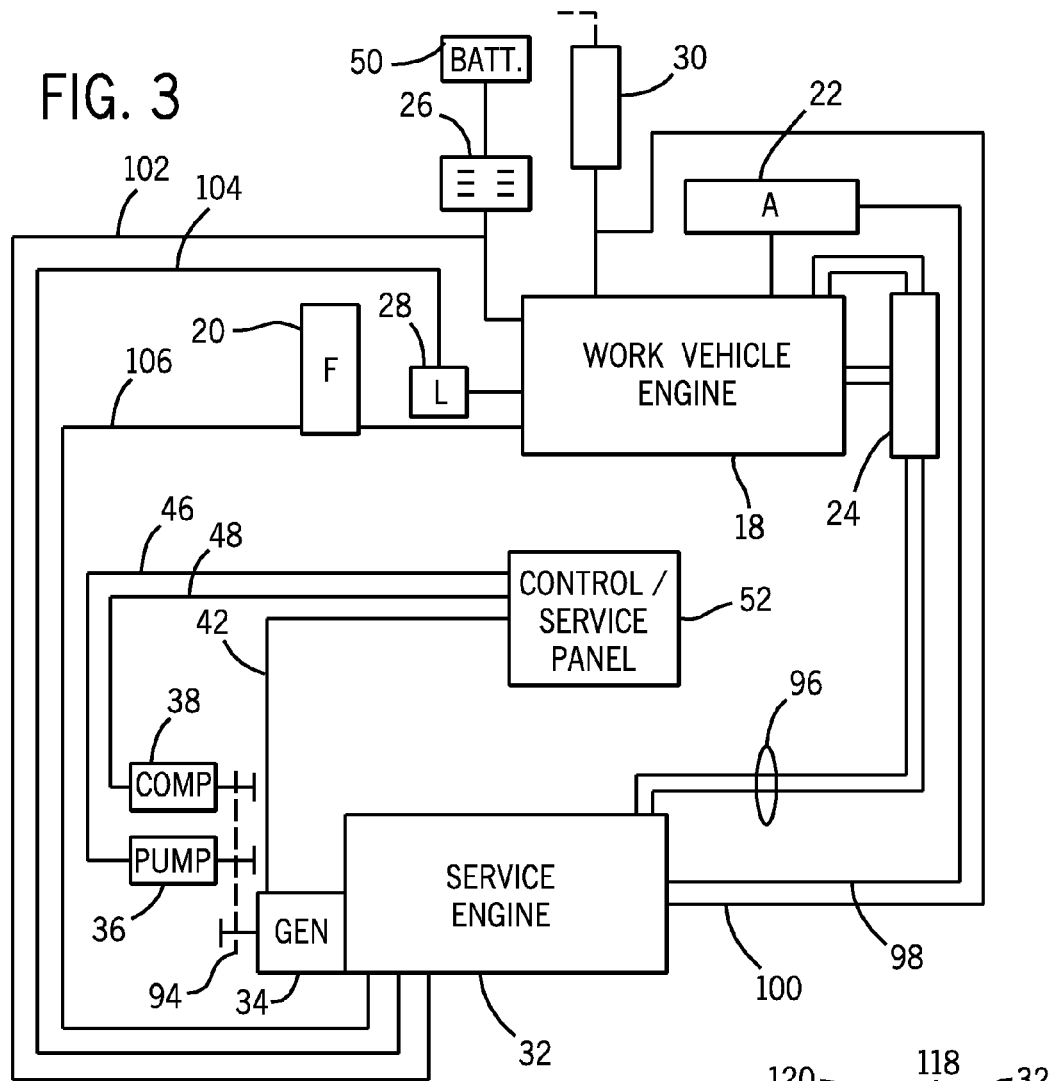
FIG. 3 is a diagram of an embodiment of power systems in the work vehicle of FIG. 1, illustrating support systems of the service pack highly integrated with support systems of the work vehicle engine.

FIG. 3 represents an alternative configuration in which the service pack 12 support systems are highly integrated with those of the main work vehicle power plant 16. In the illustrated embodiment of FIG. 3, for example, all of the systems described above may be at least partially integrated with those of the work vehicle power plant 16. Thus, coolant lines 96 may be routed to and from the work vehicle cooling system 24 of the work vehicle 10, while an air supply conduit 98 may be routed from the air intake and cleaning system 22 of the work vehicle 10. Similarly, an exhaust conduit 100 may route exhaust from the service engine 32 to the exhaust system 30 of the work vehicle 10. The embodiment of FIG. 3 also illustrates integration of the electrical systems of the work vehicle 10 and the service pack 12, as indicated generally by electrical cabling 102, which may route electrical power to and from the distribution system 26 of the work vehicle 10. The systems may also integrate lube oil functions, such that lubricating oil may be extracted from both crank cases in common, to be cleaned and cooled, as indicated by conduit 104. Finally, a fuel conduit 106 may draw fuel from the main fuel reservoir 20 of the work vehicle 10, or from multiple reservoirs where such multiple reservoirs are present on the work vehicle 10.

In presently contemplated embodiments, integrated systems of particular interest include electrical and fuel systems. For example, while the generator 34 of the service pack 12 may provide 110-volt AC power for certain applications, its ability to provide 12-volt DC output may be particularly attractive to supplement the charge on the work vehicle battery 50, for charging other batteries, and so forth. The provision of both power types, however, makes the system even more versatile, enabling 110-volt AC loads to be powered (e.g., for tools, welders, and so forth) as well as 12-volt DC loads (e.g., external battery chargers, portable or cab-mounted heaters or air conditioners, and so forth).

Integrated solutions between those of FIG. 2 and FIG. 3 may also be utilized. For example, some of the support systems may be separated in the work vehicle 10 both for functional and mechanical reasons. Embodiments of the present invention thus contemplate various solutions between those shown in FIG. 2 and FIG. 3, as well as some degree of elimination of redundancy between these systems. For instance, at least some of the support systems for the main work vehicle engine 18 may be used to support the service pack 12. For example, at least the fuel supply and electrical systems may be at least partially integrated to reduce the redundancy of these systems. The electrical system may thus serve certain support functions when the work vehicle engine 18 is turned off, removing dependency from the electrical system, or charging the vehicle battery 50. Similarly, heating, ventilating, and air conditioning systems may be supported by the service pack engine 32, such as to provide heating of the work vehicle 10 when the main work vehicle engine 18 is turned off. Thus, more or less integration and removal of redundancy may be possible.

Figure 4A:
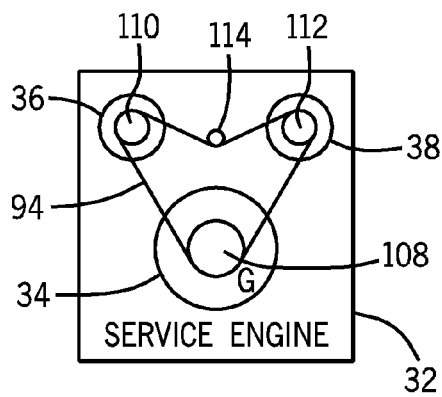
FIGS. 4A-4C are diagrams of the service pack with different arrangements of an electrical generator, a hydraulic pump, and an air compressor driven by a service pack engine.
Figure 4B:
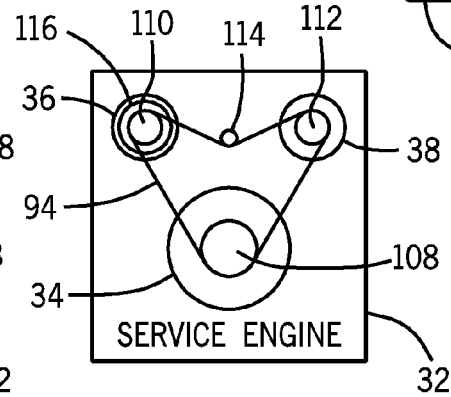
Figure 4C:
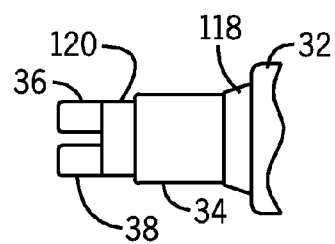

The foregoing service pack systems may also be integrated in any suitable manner for driving the service components, particularly the generator 34, hydraulic pump 36, and air compressor 38, and particularly for powering the on-board electrical system. FIGS. 4A-4C illustrate simplified diagrams of certain manners for driving these components from the service engine 32. In the embodiment illustrated in FIG. 4A, the generator 34 may be close-coupled to the output of the engine 32, such as directly to the engine flywheel or to a shaft extending from the engine 32. This coupling may be disposed in a support housing used to support the generator 34 on the engine block or other engine support structures. A sheave 108 may be mounted to an output shaft extending from the generator, and similar sheaves 110 and 112 may be coupled to the hydraulic pump 36 and air compressor 38. One or more belts and/or clutches may be drivingly coupled between these components, and an idler 114 may be provided for maintaining tension on the belt. Such an arrangement is shown in FIG. 4B, in which the hydraulic pump 36 is driven through a clutch 116, such as an electric clutch. Although not shown specifically, any one of the components may be similarly clutched to allow for separate control of the components. Such control may be useful for controlling the power draw on the service engine 32, particularly when no load is drawn from the particular component, and when the component is not needed for support of the main vehicle engine systems (e.g., maintaining a charge on the vehicle batteries).

These components may be supported in any suitable manner, and may typically include some sort of rotating or adjustable mount such that the components may be swung into and out of tight engagement with the belt to maintain the proper torque-carrying tension on the belt and avoid slippage. More than one belt may be provided on appropriate multi-belt sheaves, where the torque required for turning the components is greater than that available from a single belt. Other arrangements, such as chain drives, may also be used. Moreover, as described above, the generator 34 may also be belt or chain driven, or more than one component may be driven directly by the service engine 32, such as in an in-line configuration. In a further alternative arrangement, one or more of the components may be gear driven, with gearing providing any required increase or decrease in rotational speed from the output speed of the service engine 32. An exemplary arrangement of this type is shown diagrammatically in FIG. 4C. In the illustrated arrangement, a support adapter 118 mounts the generator 34 on the service engine 32, and the hydraulic pump 36 and air compressor 38 are driven by a gear reducer 120. In such arrangements, one or more clutches may still be provided upstream or downstream of the gear reducer 120 for selective control of the components.

The particular component or components that are directly and/or indirectly driven by the service engine 32 may be selected based upon the component and engine specifications. For example, it may be desirable to directly drive the hydraulic pump 36, and to drive the generator 34 via a belt or gear arrangement, permitting the service engine 32 to operate at a higher speed (e.g., 3200 RPM) while allowing a reduced speed to drive the generator 34 (e.g., 1800 RPM for near 60 Hz AC output of a 4 pole generator).

As described above, in certain embodiments, the service engine 32 may consume fuel from the main fuel reservoir 20 of the work vehicle 10. In other words, both the work vehicle 10 and the service engine 32 may consume fuel from the main fuel reservoir 20. As such, in order to monitor fuel usage of the service engine 32, a separate fuel usage monitoring system may be utilized. In other words, a system may be used to specifically monitor the flow of fuel from the main fuel reservoir 20 into the service engine 32. However, fuel flow meters can be somewhat expensive. Therefore, systems capable of monitoring the fuel usage of the service engine 32 without using fuel flow meters are beneficial.

Embodiments of the present invention provide operators of the service pack 12 the ability to monitor fuel usage of the service engine 32. As discussed in greater detail below, the disclosed embodiments monitor control signals sent to and from the service engine 32, fuel injection pump, governor, or other associated equipment. These control signals may be used to indirectly determine the fuel usage rate of the service engine 32. Testing the service engine 32 under various loads while collecting data associated with the control signals may allow for the determination of fuel injection rates for the service engine 32 at various operating speeds of the service engine 32. Using this data, software may be written to convert the control signals into a representation of fuel usage of the service engine 32.

Figure 5:
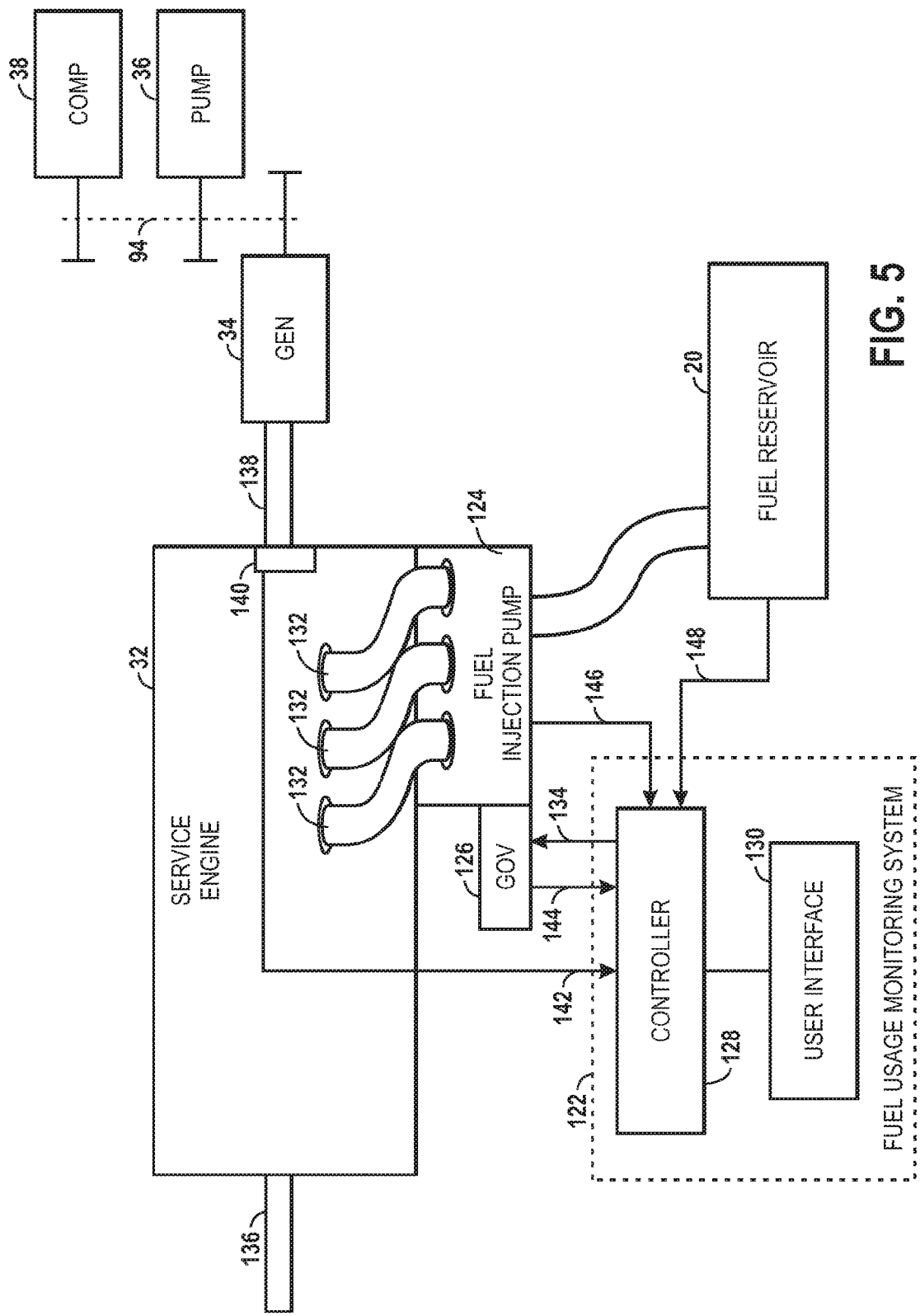
FIG. 5 is a diagram of an embodiment of a fuel usage monitoring system, illustrating how the fuel usage monitoring system may integrate with the service engine, a fuel injection pump associated with the service engine, and a governor associated with the fuel injection pump.

FIG. 5 is a diagram of an embodiment of a fuel usage monitoring system 122, illustrating how the fuel usage monitoring system 122 may integrate with the service engine 32, a fuel injection pump 124 associated with the service engine 32, and a governor 126 associated with the fuel injection pump 124. The fuel usage monitoring system 122 may include, among other things, a controller 128 and a user interface 130. In general, the fuel injection pump 124 draws fuel from a fuel reservoir. In the illustrated embodiment, the fuel injection pump 124 draws fuel from the main fuel reservoir 20 of the work vehicle 10. However, in other embodiments, the fuel injection pump 124 may draw fuel from a dedicated fuel reservoir 82, as illustrated in FIG. 2. The fuel injection pump 124 injects fuel received from the fuel reservoir 20 into the service engine 32 via a plurality of fuel injection conduits 132. The rate of fuel injection from the fuel injection pump 124 into the service engine 32 may be regulated at least partially by the governor 126. As will be discussed in detail below, the fuel usage monitoring system 122 may monitor the rate of fuel injection into the service engine 32 without using flow meters. More specifically, the controller 128 of the fuel usage monitoring system 122 may receive and transmit various control signals to and from the service engine 32, fuel injection pump 124, governor 126, and so forth, and may use these control signals to indirectly determine the rate of fuel injection into the service engine 32.

The governor 126 may generally be configured to regulate the speed of the service engine 32 based on a desired speed set point. In certain embodiments, the service engine 32 may be configured to operate at discrete operating speeds (e.g., 1800 rpm, 2600 rpm, 3200 rpm, and 3600 rpm). However, in other embodiments, the service engine 32 may be configured to operate at continuously variable operating speeds. The governor 126 may include an electronic governor configured to control the service engine 32 via the fuel injection pump 124 based on input control signals and monitored parameters (e.g., output control signals) of the service engine 32 and associated equipment. For example, the governor 126 may receive a control signal 134 commanding a given speed and the governor 126 may then generate an output signal to control the rate of fuel injection from the fuel injection pump 124 into the service engine 32.

In the illustrated embodiment, the control signal 134 may be generated by the controller 128 of the fuel usage monitoring system 122. However, in other embodiments, the control signal 134 may be generated external to the fuel usage monitoring system 122. The control signal 134 may be produced based on a control algorithm embedded within the controller 128. For example, the controller 128 may monitor the operating speed and command the governor 126 to increase or decrease the speed of the service engine 32 accordingly. In other embodiments, the governor 126 may include an onboard control loop (such as a proportional-integral-derivative (PID) controller) that regulates the speed of the service engine 32. Thus, the governor 126 may independently regulate the service engine 32 to meet the parameters requested by the control signal 134 output by the controller 128. In other words, the governor 126 may receive a signal requesting a given speed and implement its own routine to regulate the service engine 32 to the desired speed. The governor 126 may include any mechanism configured to receive the control signal 134 and regulate the service engine 32 based on the control signal 134.

The governor 126 may be mounted to the fuel injection pump 124 in various configurations that enable the governor 126 to regulate the fuel injection from the fuel injection pump 124. In an embodiment, the governor 126 may be mechanically coupled to the fuel injection pump 124. Mechanically coupling the governor 126 to the fuel injection pump 124 enables the governor 126 to manipulate components of the service engine 32, including a rack position, and the like. Mechanically coupling the governor 126 may include providing the fuel injection pump 124 with the governor 126 built into the fuel injection pump 124, directly attaching the governor 126 to the body of the fuel injection pump 124, or providing the governor 126 as a separate component with a linkage to the fuel injection pump 124.

The service engine 32 may include a drive shaft 136 and a stub shaft 138, which may both be rotated by the service engine 32. For simplicity, the remainder of the discussion refers to the transfer of power via the stub shaft 138, although similar systems may also make use of the drive shaft 136. The stub shaft 138 may, in certain embodiments, be coupled to the generator 34, as illustrated. Also, as described above with respect to FIGS. 4A-4C, the hydraulic pump 36 and the air compressor 38 may be mechanically coupled to a shaft of the generator 34 via one or more belts 94. Accordingly, power from the service engine 32 may be received by the generator 34, the hydraulic pump 36, and the air compressor 38 as torque. In addition, one or more sensors 140 may be used to monitor operating parameters (e.g., shaft speed, torque, vibration, temperature, and so forth) of the service engine 32. For instance, the sensor 140 may be a speed sensor configured to generate control signals representing the operating speed of the stub shaft 138.

The controller 128 of the fuel usage monitoring system 122 may transmit and receive various control signals to and from the service engine 32, fuel injection pump 124, governor 126, fuel reservoir 20, and other components of the service pack 12 and/or the work vehicle 10. These various control signals may be used by the controller 128 to indirectly determine the rate of fuel usage of the service engine 32. For instance, the controller 128 may receive feedback or signals 142 relating to the service engine 32. In particular, the controller 128 may receive a control signal 142 generated by the sensor 140 associated with the service engine 32. In particular, as described above, the sensor 140 may generate feedback or signals 142 relating to the operating speed of the service engine 32, the torque generated by the service engine 32, vibration of the stub shaft 138 of the service engine 32, and so forth. In addition, the controller 128 may receive a control signal 144 relating to a parameter of the governor 126. For instance, the control signal 144 relating to the governor 126 may relate to a position of a solenoid, which is used as an actuation device for adjusting the fuel injection rate of the fuel injection pump 124. Similarly, as described above, the controller 128 may transmit the input control signal 134 to the governor 126 for regulating the position of the solenoid. Also, the controller 128 may receive a control signal 146 relating to a parameter of the fuel injection pump 124. For instance, the control signal 146 may relate to a position of a control rack, which is used to turn a plunger of the fuel injection pump 124 into a desired position for adjusting the rate of fuel injection into the service engine 32. The controller 128 may also receive a control signal 148 relating to a parameter of the fuel reservoir 20. For instance, the control signal 148 may relate to a fuel level in the fuel reservoir 20.

As described in greater detail below, each of the control signals 134, 142, 144, 146, and 148 may be used by the controller 128 to determine a fuel usage rate of the service engine 32. It should be noted that all of the control signals 134, 142, 144, 146, and 148 described herein are not directly related to fuel usage rates or any other rate which could be directly measured by a flow meter (e.g., fuel flow rates, fuel injection rates, fuel velocities, fuel mass flow rates, and so forth). This is because, as described above, the disclosed embodiments are primarily directed toward methods for determining the fuel usage rate of the service engine 32 without the use of flow meters. Therefore, the control signals 134, 142, 144, 146, and 148 used are not directly related to fuel usage rates. Rather, as described above, the control signals 134, 142, 144, 146, and 148 may be related to linear positions, angular positions, operating speeds, tank levels, vibration levels, temperatures, pressures, and so forth.

Figure 6:
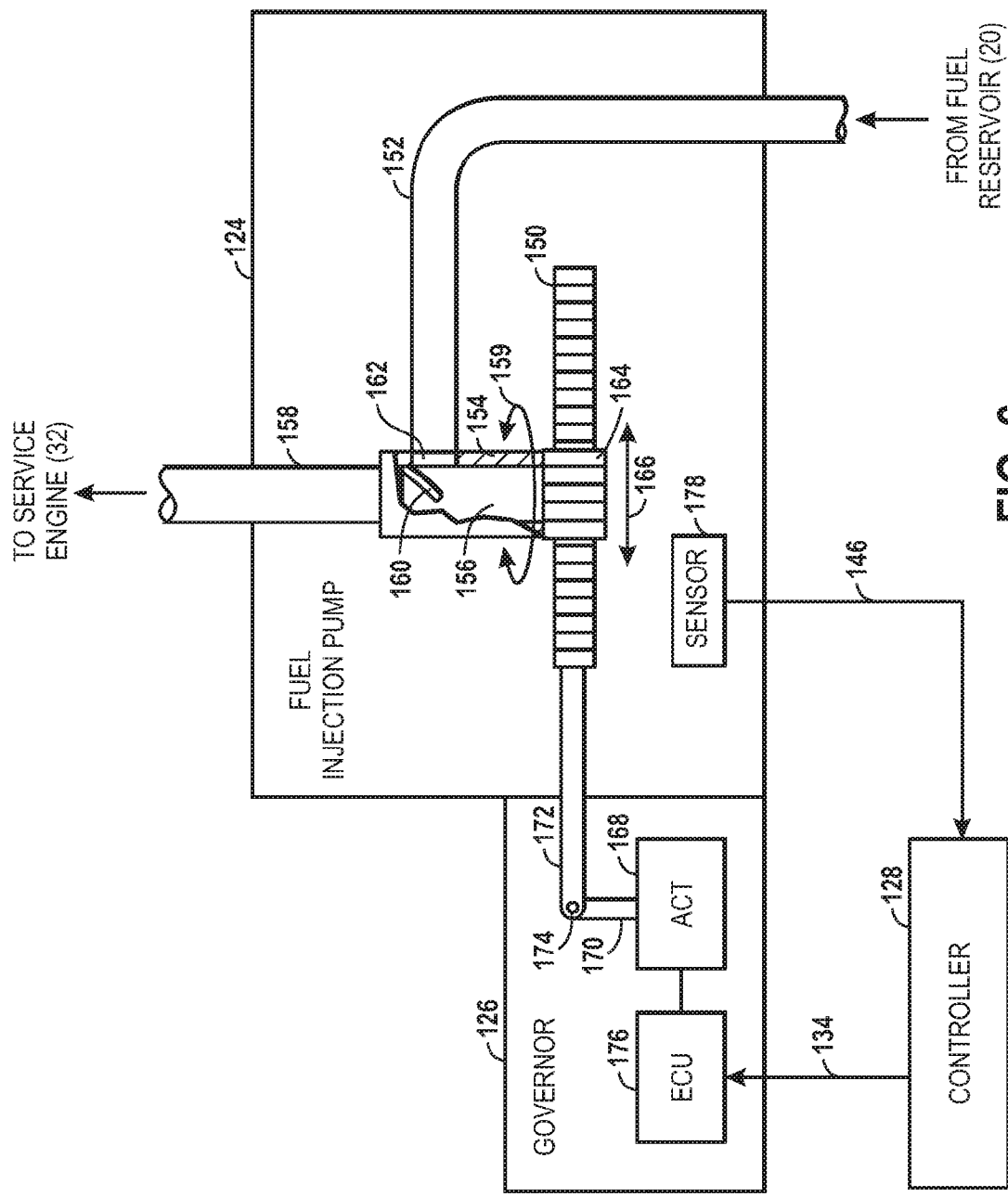
FIG. 6 is a partial cross section view of an exemplary embodiment of the fuel injection pump and the governor, illustrating how a control signal relating to an operating parameter of the fuel injection pump may be generated.

FIG. 6 is a partial cross section view of an exemplary embodiment of the fuel injection pump 124 and the governor 126, illustrating how the control signal 146 relating to an operating parameter of the fuel injection pump 124 may be generated. In particular, the illustrated embodiment depicts how a position of a control rack 150 may be generated and sent to the controller 128 for use in determining the fuel usage rate of the service engine 32. As illustrated, fuel from the fuel reservoir 20 may be received by the fuel injection pump 124 through a fuel inlet conduit 152. The fuel may flow through a barrel 154 and plunger 156 of the fuel injection pump 124 and may be injected into the service engine 32 through the fuel outlet conduit 158. In general, the amount of fuel delivered to the service engine 32 may depend on the rotational alignment of the plunger 156 within the barrel 154, as indicated by arrow 159. In particular, the rotational alignment 159 of the plunger 156 within the barrel 154 determines the position of a helix 160 on the barrel 154 with respect to an end 162 of the fuel inlet conduit 152. The helix 160 may be a helical groove within the surface of the plunger 156, which is configured to adjust the flow of fuel through the barrel 154 and plunger 156. In particular, the position of the helix 160 relative to the end 162 of the fuel inlet conduit 152 determines the amount of fuel allowed to flow through the barrel 154 and plunger 156. Therefore, the rotational alignment of the helix 160 within the barrel 154 functions as a mechanical set point for the fuel injection rate into the service engine 32.

The rotational alignment 159 of the plunger 156 within the barrel 154 may be adjusted by the control rack 150, which may include a pinion 164 attached to the plunger 156. In general, as the control rack 150 moves relative to the pinion 164, as illustrated by arrow 166, the pinion 164 may rotate, causing the plunger 156 to rotate as well. In turn, the rotational alignment 159 of the plunger 156 may change the rotational position of the helix 160 with respect to the end 162 of the fuel inlet conduit 152, thereby adjusting the amount of fuel allowed through the barrel 154 and plunger 156.

The governor 126 may control the position of the control rack 150. In particular, the governor 126 may include an actuator 168 (e.g., a solenoid) which may be configured to mechanically adjust the position of the control rack 150. More specifically, in certain embodiments, the actuator 168 may be configured to mechanically actuate a first arm 170, which is coupled to a second arm 172 via a pin 174. As the first arm 170 is actuated, the second arm 172 may cause the control rack 150 to move from side to side, as illustrated by arrow 166. The actuator 168 may, in certain embodiments, be controlled by an electronic control unit (ECU) 176 of the governor 126. The ECU 176 may receive the control signal 134 from the controller 128 of the fuel usage monitoring system 122.

As discussed above, the controller 128 may receive the control signal 146 from the fuel injection pump 124. In the embodiment illustrated in FIG. 6, the control signal 146 may relate to the position of the control rack 150. For instance, a sensor 178 within the fuel injection pump 124 may be configured to measure the position of the control rack 150, generate the control signal 146 relating the position of the control rack 150, and transmit the control signal 146 to the controller 128. Also, in addition to generating a control signal 146 relating to a linear position of the control rack 150, the sensor 178 may also be configured to generate a control signal 146 relating to an angular position of the pinion 164, an angular position of the plunger 156, an angular position of the helix 160, and so forth.

Returning now to FIG. 5, each of the control signals 134, 142, 144, 146, and 148 may be used by the controller 128 to determine a fuel usage rate of the service engine 32. The controls signals 134, 142, 144, 146, and 148 may either be used individually or in combination for determining the fuel usage rate. For instance, in certain embodiments, the control signal 146 relating to the rack position may be the only control signal used to determine the fuel usage rate. However, in other embodiments, the control signal 146 relating to the rack position may be combined with other control signals, such as the control signal 144 relating to the position of the solenoid of the governor 126, to determine the fuel usage rate. Indeed, various combinations of the control signals 134, 142, 144, 146, and 148 may be utilized.

Whether using a single control signal or multiple control signals, the method for determining fuel usage of the service engine 32 based on the control signals may be substantially similar. FIG. 7 is a flow chart illustrating an exemplary method 180 for determining the fuel usage rate of the service engine 32 based on the control signals 134, 142, 144, 146, and 148. In step 182, test control signals 134, 142, 144, 146, and 148 may be received by the controller 128. As described above, the test control signals 134, 142, 144, 146, and 148 may relate to parameters of the service engine 32, the governor 126, the fuel injection pump 124, and the fuel reservoir 20. However, the test control signals 134, 142, 144, 146, and 148 may, in fact, relate to any parameters of various components of the service pack 12 and/or the work vehicle 10 which correlate with the fuel usage rate of the service engine 32. For instance, feedback associated with the air compressor 38, the hydraulic pump 36, the generator 34, and so forth, may be used.

The test control signals 134, 142, 144, 146, and 148 may be collected during a testing time period when the actual fuel usage rate of the service engine 32 may be measured. For instance, in step 184, test fuel usage rates of the service engine 32 may be measured. The fuel usage rates may be measured in various ways. For example, in certain embodiments, the fuel flow rates may be measured using flow meters on the service engine 32, the fuel injection pump 124, or a combination thereof. The fuel flow rates measured by the flow meters may directly correlate to fuel usage rates of the service engine 32. In other embodiments, the fuel usage rates may be measured by monitoring tank levels in the fuel reservoir 20. The tank levels may indirectly correlate (e.g., via volumetric and/or mass balance equations) to fuel usage rates of the service engine 32.

The test controls signals 134, 142, 144, 146, and 148 and the measured fuel usage rates may be collected from either a production service engine 32 or a service engine 32 specifically designed for testing for correlations between the test controls signals 134, 142, 144, 146, and 148 and the measured fuel usage rates. In other words, the service engine 32 used to collect the test controls signals 134, 142, 144, 146, and 148 and the measured fuel usage rates may not be the actual production service engine 32 for which the algorithms corresponding to the correlations are developed. Furthermore, the process of collecting test controls signals 134, 142, 144, 146, and 148 and the measured fuel usage rates may not be a one-time function. For instance, due at least in part to changing operating conditions and performance changes, the algorithms corresponding to the correlations may need to be re-calibrated over time.

Once the test controls signals 134, 142, 144, 146, and 148 and the measured fuel usage rates have been collected, the collected information may be used to determine relationships between the controls signals 134, 142, 144, 146, and 148 and the measured fuel usage rates. For instance, in step 186, the test control signals 134, 142, 144, 146, and 148 may be correlated with the measured fuel usage rates. The correlations may be determined using various data correlation techniques. In general, since only a finite number of control signals 134, 142, 144, 146, and 148 may typically be used, the correlations may generally be limited to line- and curve-fitting techniques. However, when multiple control signals 134, 142, 144, 146, and 148 are used, more advanced correlation techniques may be used, such as nonlinear and multi-variate analyses.

FIGS. 8A and 8B are graphs illustrating exemplary correlations between fuel usage rates of the service engine 32 and positions of the control rack 150 of the fuel injection pump 124 of FIG. 6. As illustrated in FIG. 8A, the correlation 196 between rack position and fuel usage rates may generally be linear in nature. In other words, as the control rack 150 moves an incremental distance, the fuel usage rate of the service engine 32 may increase or decrease by a proportional amount. In particular, the correlation 196 of rack position to fuel usage rate may be substantially linear at higher operating speeds of the service engine 32 (e.g., operating speeds greater than or equal to 2600 rpm). Conversely, as illustrated in FIG. 8B, the correlation 198 of rack position to fuel usage rate may be somewhat non-linear at lower operating speeds (e.g., operating speeds less than 2600 rpm). In other words, as described above, the correlations between fuel usage rates and the control signals 134, 142, 144, 146, and 148 may vary depending on the operating speed of the service engine 32. More specifically, the fuel usage rate of the service engine 32 may be a function of the parameters (e.g., the control rack position) relating to the control signals 134, 142, 144, 146, and 148 and the operating speed of the service engine 32.

Returning now to FIG. 7, in addition to programmatically determining correlations between the test controls signals 134, 142, 144, 146, and 148 and the measured fuel usage rates, an operator of the service engine 32 may provide input relating to the correlations. For instance, in certain embodiments, correlation options may be generated by the controller 128 and the correlation options may be displayed to the operator via the user interface 130 of the fuel usage monitoring system 122. The operator may investigate the options presented by the controller 128 and may select certain options, which may be used to finalize the correlations between the test controls signals 134, 142, 144, 146, and 148 and the measured fuel usage rates. For instance, the controller 128 may present the operator with several line- or curve-fit options relating to the correlations and the operator may select between the various options.

In block 188, after the correlations between the test controls signals 134, 142, 144, 146, and 148 and the measured fuel usage rates have been determined, these correlations may be used to develop algorithms corresponding to the correlations. The algorithms may be stored within the controller 128 for use during non-testing operation of the fuel usage monitoring system 122. For example, the algorithms may take the form of computer code (e.g., software) stored in memory within the controller 128. In block 190, during non-testing operation of the fuel usage monitoring system 122, the controller 128 may transmit or receive non-test control signals 134, 142, 144, 146, and 148 and execute the computer code containing the correlation algorithms using the data represented by the control signals 134, 142, 144, 146, and 148 to determine the fuel usage rate of the service engine 32 (block 192).

In block 194, once the fuel usage rate of the service engine 32 is determined, the fuel usage rate may be recorded, reported, and/or displayed to an operator. For instance, the fuel usage rates may be recorded in memory within the controller 128 or, more specifically, in a database stored in the memory. Additionally, the fuel usage data may be stored in memory external to the controller 128. For instance, the fuel usage data may be stored in a remote database, where the data is transmitted to the remote database using suitable communication (e.g., wireless data communication) technologies from the fuel usage monitoring system 122. In addition to storing the fuel usage data, the controller 128 may be configured to report the fuel usage data. For instance, the fuel usage data may be transmitted using suitable communication technologies for remote use. In addition, in certain embodiments, the fuel usage data may be printed onto paper locally, in the form of list data, graphs, and so forth. These reporting techniques may prove beneficial for logging fuel usage data. In particular, as described above, the ability to record and report "off road" fuel usage data reliably may lead to tax credits. Additionally, the fuel usage data may be displayed to an operator. For instance, the fuel usage data may be output to a monitor, which may be part of the user interface 130 of the fuel usage monitoring system 122. It should be noted that, in general, steps 182-188 of the method 180 may be performed at a factory or during servicing, whereas steps 190-194 of the method 180 may be performed during actual use of the service engine 32.

The disclosed embodiments provide several advantages. For example, the fuel usage monitoring system 122 may allow for the reliable determination of fuel usage rates of the service engine 32 without requiring the use of relatively expensive flow meters. Rather, the fuel usage monitoring system 122 may simply make use of control signals 134, 142, 144, 146, and 148 which are already available. Furthermore, as describe above, the ability to reliably monitor the fuel usage of the service engine 32 may allow for certain tax benefits. In particular, "off road" fuel usage may be subject to lower overall taxes than "on road" fuel usage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for determining fuel usage rates, comprising:
receiving a test control signal at a fuel usage monitoring controller, wherein the test control signal relates to an operating parameter of an engine, wherein the operating parameter is not directly related to fuel usage rates;
measuring a test fuel usage rate of the engine;
correlating the test control signal and the test fuel usage rate to obtain a correlation from the test control signal to the test fuel usage rate of the engine;
developing an algorithm corresponding to the correlation between the test controls signal and the test fuel usage rate of the engine;
receiving at least one control signal relating to the operating parameter of the engine; and
determining a fuel usage rate of the engine based at least in part on the at least one control signal and the developed algorithm.

2. The method of claim 1, wherein the test control signal and the at least one control signal relate to a position of a control rack of a fuel injection pump associated with the engine.

3. The method of claim 1, wherein the test control signal and the at least one control signal relate to a position of a solenoid of a governor associated with the engine.

4. The method of claim 1, wherein the test control signal and the at least one control signal relate to a tank level of a fuel reservoir associated with the engine.

5. The method of claim 1, wherein the test control signal and the at least one control signal relate to an operating speed of the engine, a torque generated by the engine, or a combination thereof.

6. The method of claim 1, wherein the test control signal and the at least one control signal comprise a plurality of control signals relating to a plurality of different operating parameters of the engine.

7. The method of claim 1, wherein the test control signal and the at least one control signal relate to an operating speed of the engine.

8. The method of claim 1, wherein determining the fuel usage rate comprises executing the algorithm corresponding to the correlation.

9. The method of claim 1, comprising generating correlation options for correlating the test control signals and test fuel usage rates.

10. A fuel usage monitoring system, comprising:
a controller configured to:
receive control signals relating to operating parameters of an engine, wherein the operating parameters are not directly related to fuel usage rates, and the operating parameters relate to a position of a control rack of a fuel injection pump associated with the engine and a position of a solenoid of a governor associated with the engine; and
determine a fuel usage rate of the engine based at least in part on the operating parameters relating to the position of the control rack and the position of the solenoid.

11. The fuel usage monitoring system of claim 10, wherein the controller comprises a memory with computer code encoded thereon, the computer code comprising algorithms corresponding to correlations between the control signals and the fuel usage rate.

12. The fuel usage monitoring system of claim 10, wherein the controller is configured to receive the control signals from the engine, a governor associated with the engine, a fuel injection pump associated with the engine, and a fuel reservoir associated with the engine.

13. The fuel usage monitoring system of claim 10, comprising a user interface configured to receive inputs from an operator of the engine and to display outputs to the operator, wherein the outputs include the fuel usage rate.

14. A system, comprising:
an engine;
one or more loads driven by the engine, wherein the one or more loads comprises an air compressor, a hydraulic pump, an electrical generator, or a combination thereof; and
a fuel usage monitor, comprising a computer storage medium having executable computer code encoded thereon, the computer code including instructions for:
receiving data representing an operating parameter of the engine, wherein the operating parameter is not directly related to fuel usage rates, and the data representing the operating parameter comprises load data received from the one or more loads driven by the engine; and
determining a fuel usage rate of the engine based at least in part on the data representing the operating parameter, including the load data.

15. The system of claim 14, wherein the operating parameter comprises a position of a control rack of a fuel injection pump associated with the engine.

16. The system of claim 14, wherein the operating parameter comprises a position of a solenoid of a governor associated with the engine.

17. The system of claim 14, wherein the operating parameter comprises a tank level of a fuel reservoir associated with the engine.

18. The system of claim 14, wherein the operating parameter comprises an operating speed of the engine or a torque generated by the engine.

19. The system of claim 14, comprising the air compressor, the hydraulic pump, and the electrical generator, wherein the load data relates to the air compressor, the hydraulic pump, and the electrical generator.

20. The system of claim 14, comprising the air compressor and the electrical generator, wherein the load data relates to the air compressor and the electrical generator.

* * * * *